United States Patent [19]

Yuan

[11] Patent Number: 5,630,460
[45] Date of Patent: May 20, 1997

[54] MOTOR-DRIVEN SCREEN ROLLER ASSEMBLY FOR AUTOMOBILES

[76] Inventor: Jenchieh Yuan, No. 14, Yen Ping S. Rd., Taipei, Taiwan

[21] Appl. No.: 604,884

[22] Filed: Feb. 22, 1996

[51] Int. Cl.⁶ .................................................... E06B 9/56
[52] U.S. Cl. ........................ 160/310; 160/120; 296/24.1
[58] Field of Search ................................ 160/310, 311, 160/312, 370.22, 120, 241, 23.1, DIG. 2, DIG. 3; 296/24.1, 37.16

[56] References Cited

U.S. PATENT DOCUMENTS

| | | | |
|---|---|---|---|
| 3,847,171 | 11/1974 | Akers et al. | 160/310 X |
| 4,815,515 | 3/1989 | Lee | 160/310 X |
| 4,874,026 | 10/1989 | Worrall | 160/370.22 X |
| 5,076,633 | 12/1991 | Hsu et al. | 160/310 X |
| 5,372,173 | 12/1994 | Horner | 160/310 X |

*Primary Examiner*—David M. Purol
*Attorney, Agent, or Firm*—Morton J. Rosenberg; David I. Klein

[57] ABSTRACT

A motor-driven screen roller assembly is provided that consists of each of two motor-driven screen rollers controlled by a FORWARD/STOP/BACKWARD control switch through a selector switch. Each motor-driven screen roller includes a mounting plate fixed to the ceiling inside an automobile, two reversible DC motors fastened on opposing ends of the mounting plate, at the bottom. A roller is coupled between the reversible DC motors, and a screen having one end fixed to the roller and an opposing end thereof being coupled to a slat. The FORWARD/STOP/BACKWARD control switch and the selector switch are connected in series between the reversible DC motors of the motor-driven screen rollers and the battery power supply circuit of the automobile. The FORWARD/STOP/BACKWARD control switch operates in cooperation with the selector switch to selectively control the operation of the DC motors of the first motor-driven screen roller or the second motor-driven screen roller.

6 Claims, 4 Drawing Sheets

MOTOR-DRIVEN SCREEN ROLLER ASSEMBLY FOR AUTOMOBILES

BACKGROUND OF THE INVENTION

The present invention relates to a motor-driven screen roller assembly for installation in an automobile for subdividing the inside space of the automobile, in order to circulate cooling air from the air-conditioner within a defined area inside the automobile.

Most users of cars drive the car alone without carrying any passengers. Furthermore, if there is only the driver in the automobile when the air-conditioner of the automobile is operated, energy is wasted by the air-conditioner. If the area around the driver is separated from the remaining inside space of the automobile for circulation of cooling air from the air-conditioner, the working efficiency of the air-conditioner can be relatively improved.

SUMMARY OF THE INVENTION

It is the main object of the present invention to provide a motor-driven screen roller assembly for automobiles which can be conveniently controlled to subdivide the inside space of the automobile so as to circulate cooling air from the air-conditioner of the automobile within a limited area around the driver. According to the present invention, the motor-driven screen roller assembly is comprised of two motor-driven screen rollers controlled by a FORWARD/STOP/BACKWARD control switch through a selector switch. Each motor-driven screen roller comprises a mounting plate fixed to the ceiling inside an automobile, two reversible DC motors bilaterally fastened to the mounting plate at the bottom, a roller coupled between the reversible DC motors, a screen having one end fixed to the roller and an opposite end coupled to a slat. The FORWARD/STOP/BACKWARD control switch and the selector switch are connected in series between the reversible DC motors of the motor-driven screen rollers and the battery power supply circuit of the automobile. The FORWARD/STOP/BACKWARD control switch operates in cooperation with the selector switch to selectively control the operation of the DC motors of the first motor-driven screen roller or the second motor-driven screen roller.

DETAILED DESCRIPTION OF THE PREFERRED EMBODIMENT

Figure 1:
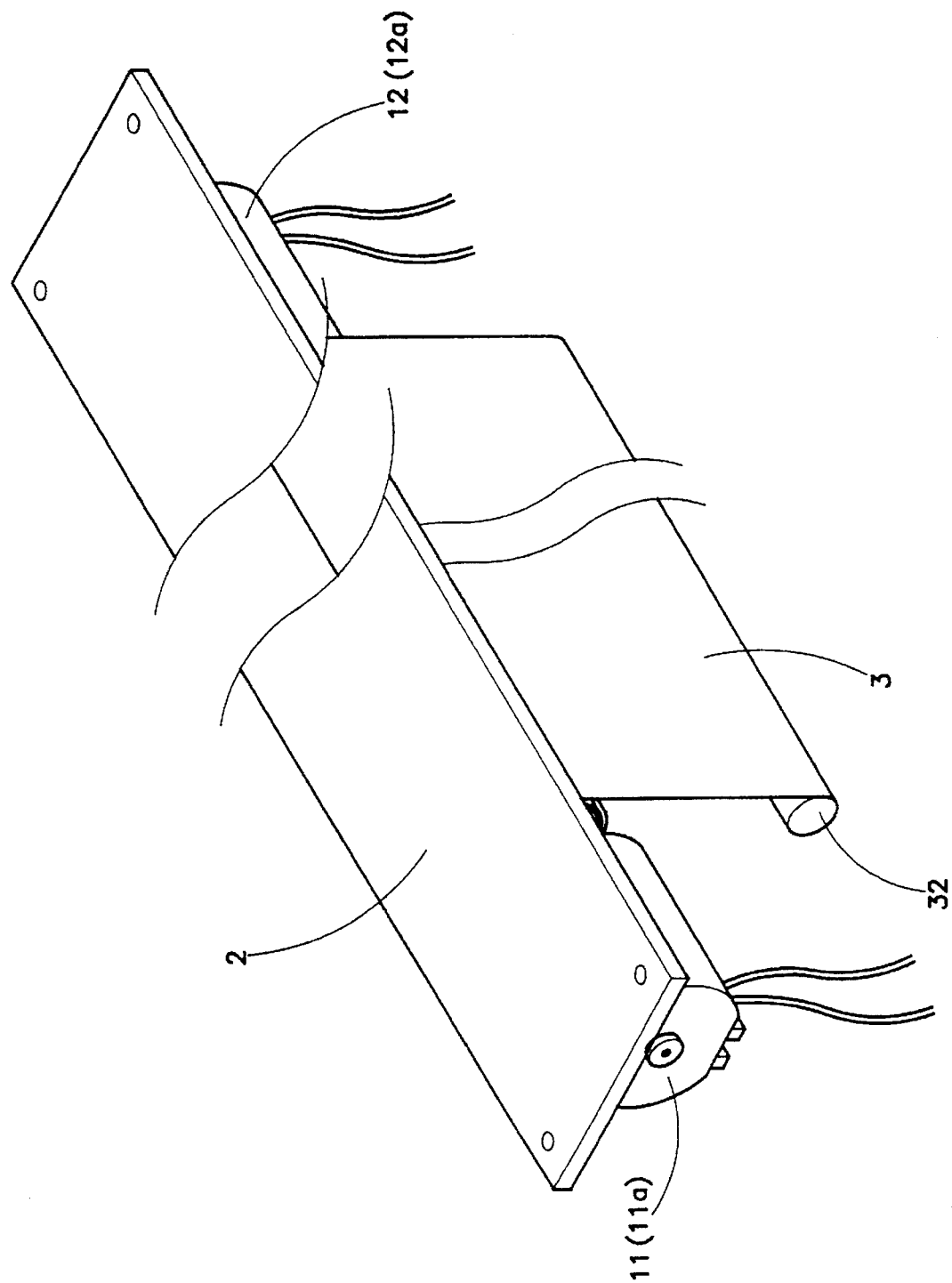
FIG. 1 is an elevational view of a motor-driven screen roller for automobiles according to the present invention.
Figure 2:
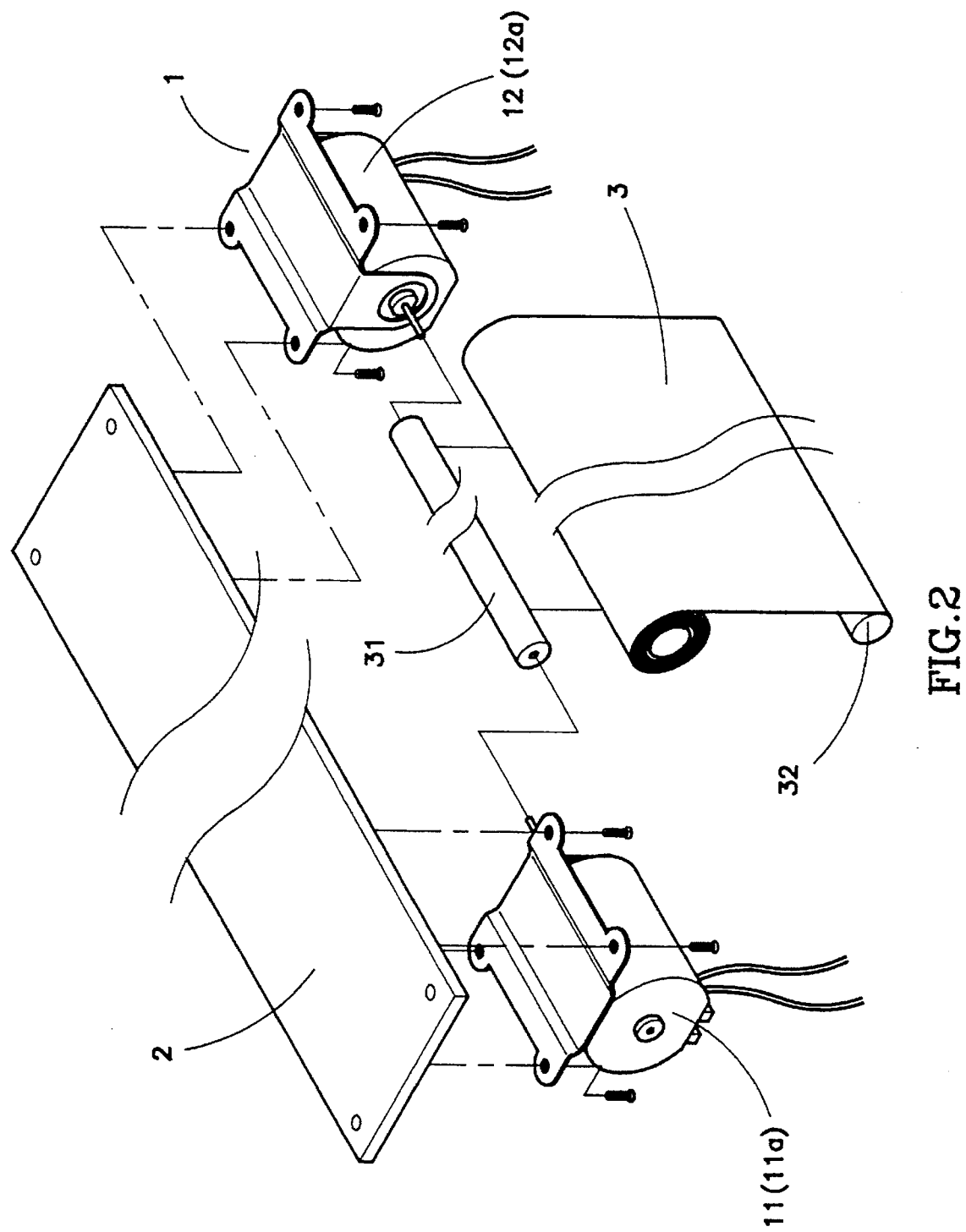
FIG. 2 is an exploded view of the motor-driven screen roller shown in FIG. 1.

Referring to FIGS. 1 and 2, a motor-driven screen roller in accordance with the present invention is generally comprised of a power drive 1, a mounting plate 2, and a screen body 3. The power drive 1 comprises two reversible 12 V DC motors 11 and 12. The mounting plate 2 can be made of any of a variety of shapes and sizes to fit the space inside the automobile in which the motor-driven screen roller is to be installed. When the mounting plate 2 is fixedly secured to the ceiling inside the automobile, the DC motors 11 and 12 are bilaterally fastened to the mounting plate 2 on the bottom side thereof by screws. The transparent screen body 3 is preferably made from transparent plastic sheet, having one end fastened to a roller 31 and an opposite end coupled to a slat 32. The roller 31 is connected between the output shafts 110 and 120 of the DC motors 11 and 12, and rotated by them.

Figure 3:
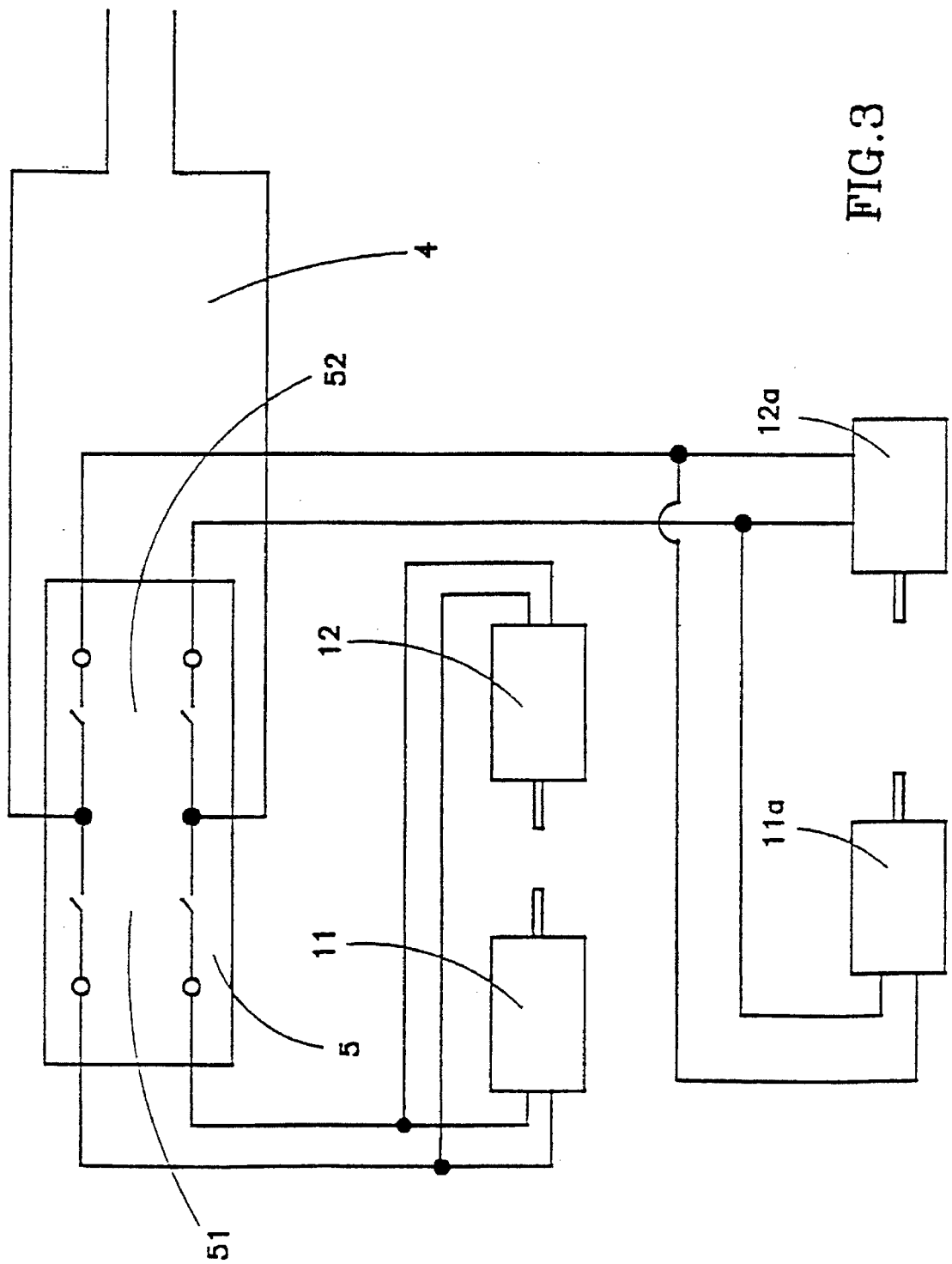
FIG. 3 is a circuit diagram of the motor control circuit according to the present invention.

Referring to FIG. 3 and FIGS. 1 and 2 again, two motor-driven screen rollers may be installed in an automobile, permitting the DC motors 11 and 12 of the first motor-driven screen roller and the DC motors 11a and 12a of the second motor-driven screen roller to be connected to the electric circuit of the automobile through a FORWARD/STOP/BACKWARD switch 4, which can be shifted to control the operation of the DC motors 11 and 12 (the DC motors 11a and 12a) synchronously, and a selector switch 5. The output end of the FORWARD/STOP/BACKWARD switch 4 is connected to the input end of the selector switch 5. The output end of the selector switch 5 has two sets of contacts 51 and 52 respectively connected to the DC motors 11 and 12 of the first motor-driven screen roller and the DC motors 11a and 12a of the second motor-driven screen roller. When the selector switch 5 is shifted to the first set of contacts 51, the DC motors 11 and 12 are connected to the FORWARD/STOP/BACKWARD switch 4, and the DC motors 11a and 12a are disconnected from the FORWARD/STOP/BACKWARD switch 4. When the switch 4 is shifted to FORWARD position, the DC motors 11 and 12 of the first motor-driven screen roller or the DC motors 11a and 12a of the second motor-driven screen roller are synchronously driven to turn the respective roller 31 in one direction, causing it to let out the respective transparent screen body 3. When the switch is shifted to BACKWARD position, the DC motors 11 and 12 of the first motor-driven screen roller or the DC motors 11a and 12a of the second motor-driven screen roller are synchronously driven to turn the respective roller 31 in the reversed direction, causing it to take up the respective transparent screen body 3. When the switch is shifted to STOP position, the DC motors 11 and 12 of the first motor-driven screen roller and the DC motors 11a and 12a of the second motor-driven screen roller are turned off.

Figure 4:
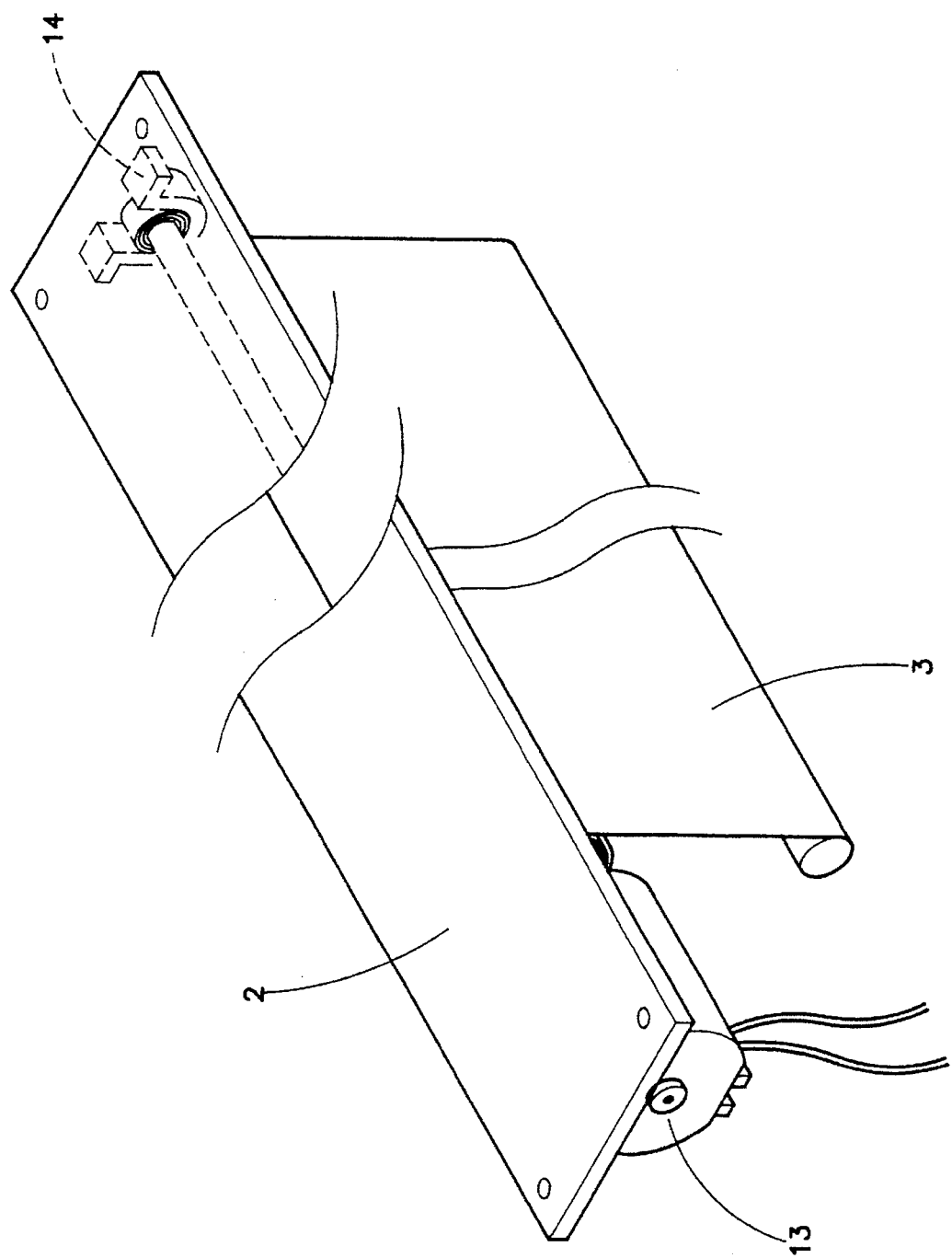
FIG. 4 is a perspective view of an alternate form of the present invention.

FIG. 4 shows an alternate form of the power drive 1. According to this alternate form, the power drive comprises a reversible DC motor 13 fastened to one end of the mounting plate 2 at the bottom side thereof to hold one end of the roller 31, a bracket 14 fastened to an opposite end of the mounting plate 2 to hold an axle bearing 15, which holds the opposite end of the roller 31.

It is to be understood that various modifications and changes could be made without departing from the spirit and scope of the invention. For example, the DC motors 11 and 12 of the power drive can be directly fastened to the inside of the automobile so that the mounting plate 2 can be eliminated.

I claim:

1. A motor-driven screen roller assembly for subdividing a passenger space inside a motor vehicle, comprising:

a pair of screens for dividing the passenger space inside the motor vehicle, said screens having lower free ends coupled respectively to a pair of slats;

a pair of rollers suspended inside the passenger space of the motor vehicle, each of said rollers having coupled thereto an upper end of a respective one of said pair of screens, wherein when each said roller is rotated in a forward direction said lower free end of said respectively coupled screen is lowered and when each said roller is rotated in a backward direction said free end of said respectively coupled screen is raised;

a pair of power drives coupled respectively to said pair of rollers, each of said power drives including at least one reversible DC motor coupled to a respective one of said pair of rollers for rotating said roller in said forward direction to lower said screen, for rotating said roller in said backward direction for raising said screen, and for stopping said rotations of said roller; and, a control circuit for providing selective control of each said power drive and said respective roller coupled thereto, said control circuit including a FORWARD/STOP/BACKWARD switch and a selector switch coupled in series for controlling a selected one of said power drives, said FORWARD/STOP/BACKWARD switch being connected between a battery power supply circuit of the motor vehicle and said selector switch, said selector switch being connected between said FORWARD/STOP/BACKWARD switch and both of said pair of power drives to selectively connect one of said power drives to said FORWARD/STOP/BACKWARD switch for control thereby, said FORWARD/STOP/BACKWARD switch being adapted to provide a selection between forward rotation, backward rotation and stopping of said selected one of said pair of power drives to correspondingly lower said screen, raise said screen and halt movement of said screen.

2. The motor-driven screen roller assembly of claim 1, wherein each of said pair of screens is formed by a transparent plastic sheet.

3. The motor-driven screen roller assembly of claim 1, further comprising a pair of mounting plates coupled to the motor vehicle within the passenger space for respectively affixing thereto said pair of power drives.

4. The motor-driven screen roller assembly of claim 1, wherein each of said pair of power drives includes a pair of reversible DC motors, each of said pair of reversible DC motors being respectively coupled to one of a pair of opposing ends of a respective one of said pair of rollers.

5. The motor-driven screen roller assembly of claim 4, where each said pair of power drives further includes a mounting plate coupled to the motor vehicle within the passenger space for respectively affixing thereto a respective pair of said reversible DC motors.

6. The motor-driven screen roller assembly of claim 1, wherein each of said pair of power drives includes a reversible DC motor coupled to a first end of a respective one of said pair of rollers, a bracket coupled to the motor vehicle within the passenger space, and an axle bearing coupled to said bracket and rotatably coupled to a second end of said respective roller.

* * * * *